(12) United States Patent
Yang et al.

(10) Patent No.: US 11,055,740 B2
(45) Date of Patent: Jul. 6, 2021

(54) ADVERTISEMENT PUSH SYSTEM, APPARATUS, AND METHOD

(71) Applicant: TENCENT TECHNOLOGY (SHENZHEN) COMPANY LIMITED, Guangdong (CN)

(72) Inventors: Xuexi Yang, Guangdong (CN); Pingfeng Cheng, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 222 days.

(21) Appl. No.: 15/660,253

(22) Filed: Jul. 26, 2017

(65) Prior Publication Data
US 2017/0323337 A1 Nov. 9, 2017

Related U.S. Application Data

(63) Continuation of application No. PCT/CN2016/083302, filed on May 25, 2016.

(30) Foreign Application Priority Data

Jun. 30, 2015 (CN) .......................... 201510374215.4

(51) Int. Cl.
*G06Q 30/02* (2012.01)
(52) U.S. Cl.
CPC ......... *G06Q 30/0257* (2013.01); *G06Q 30/02* (2013.01); *G06Q 30/0276* (2013.01)
(58) Field of Classification Search
CPC ........................................... G06Q 30/02–0277
(Continued)

(56) References Cited

U.S. PATENT DOCUMENTS 6,128,663 A * 10/2000 Thomas ................. G06Q 30/02
709/217
9,760,631 B1 * 9/2017 Broxton ................. G06Q 30/00
(Continued)

FOREIGN PATENT DOCUMENTS

CN 101253527 A 8/2008
CN 101253529 A 8/2008
(Continued)

OTHER PUBLICATIONS

D. Dwihananto "Effectively Finding the Right Keywords for Target Audience" 2007 IEEE International Symposium on Signal Processing and Information Technology pp. 766-771 (Year: 2007).*
(Continued)

*Primary Examiner* — Raquel Alvarez
(74) *Attorney, Agent, or Firm* — Anova Law Group, PLLC

(57) ABSTRACT

An advertisement push apparatus and method are provided. In some embodiments, the apparatus includes: a foreground advertisement playing module configured to play a foreground advertisement according to a playing address of the foreground advertisement provided by a background server; a material displaying module configured to display preview materials of all or some of n candidate advertisements upon detection of a selection instruction triggered by a user during a process of playing the foreground advertisement, where n is a positive integer; and a candidate advertisement selecting and playing module configured to select at least one candidate advertisement from the n candidate advertisements for playing, in response to a selection operation of the user performed on the preview materials of the candidate advertisements.

15 Claims, 9 Drawing Sheets

(58) Field of Classification Search
USPC .......................................... 705/14.1–14.73
See application file for complete search history.

(56) References Cited

U.S. PATENT DOCUMENTS

| | | | |
|---|---|---|---|
| 2007/0050252 A1 | 3/2007 | Jain | |
| 2007/0050253 A1 | 3/2007 | Biggs et al. | |
| 2008/0027807 A1* | 1/2008 | Matsumoto | G06Q 30/02 705/14.41 |
| 2008/0215432 A1* | 9/2008 | Stetson | G06Q 30/0251 705/14.49 |
| 2009/0210899 A1* | 8/2009 | Lawrence-Apfelbaum | H04L 12/2801 725/34 |
| 2010/0050201 A1* | 2/2010 | Kubota | G06Q 30/02 725/12 |
| 2010/0082435 A1* | 4/2010 | Hartman | G06Q 30/02 705/14.55 |
| 2011/0258529 A1* | 10/2011 | Doig | G06Q 30/02 715/234 |
| 2012/0110620 A1 | 5/2012 | Kilar et al. | |
| 2013/0086082 A1 | 4/2013 | Park et al. | |
| 2014/0026071 A1* | 1/2014 | Garcia-Martinez | G06F 3/0481 715/753 |
| 2015/0287410 A1* | 10/2015 | Mengibar | G10L 17/005 704/246 |
| 2015/0317691 A1* | 11/2015 | Mishra | G06Q 30/0269 705/14.66 |
| 2015/0373396 A1* | 12/2015 | Makhlouf | H04N 21/4312 725/14 |
| 2016/0196583 A1* | 7/2016 | Altberg | G06Q 30/0257 705/14.58 |
| 2018/0032997 A1* | 2/2018 | Gordon | G06Q 20/3224 |

FOREIGN PATENT DOCUMENTS

| | | |
|---|---|---|
| CN | 101282455 A | 10/2008 |
| CN | 101540779 A | 9/2009 |
| CN | 102081775 A | 6/2011 |
| CN | 104036404 A | 9/2014 |
| CN | 104090921 A | 10/2014 |
| CN | 101599152 A | 11/2015 |
| CN | 105046525 A | 11/2015 |
| JP | 2003-244677 A | 8/2003 |
| JP | 2004-078475 A | 3/2004 |
| JP | 2010-508780 A | 3/2010 |
| JP | 2010128999 A | 6/2010 |
| JP | 2012-525637 A | 10/2012 |
| JP | 2014-534671 A | 12/2018 |
| KR | 20090070424 A | 7/2009 |
| KR | 2009-0092498 A | 9/2009 |
| KR | 2013-0035064 A | 4/2013 |
| KR | 2014/0081483 A | 7/2014 |

OTHER PUBLICATIONS

Office Action with Translation Issued for Korean Application No. 10-2019-7011338 dated Jul. 19, 2019.
International Search Report in International Application No. PCT/CN2016/083302 dated Aug. 24, 2016 in 2 pages.
Office Action with Translation for Japanese Application No. 2017-558613 dated Jun. 5, 2018.
Korean Office Action with Translation for Application No. 10-2017-7021799 dated May 21, 2018.
The State Intellectual Property Office of the People's Republic of China (SIPO) Office Action 1 for 201510374215.4 dated Feb. 11, 2018 19 Pages (including translation).
Jingping Zen, "Radio and Television Website industry," Beijing University of Posts and Telecommunications Press, Jul. 31, 2014 (Jul. 31, 2014), p. 130 Total 7 pages.
Wei Yang et al., "Internet + Insurance marketing," Capital Economic and Trade University Press, May 31, 2015 (May 31, 2015), pp. 264-265 Total 9 pages.

* cited by examiner

ADVERTISEMENT PUSH SYSTEM, APPARATUS, AND METHOD

CROSS REFERENCE OF RELATED APPLICATION

This application is a continuation of International Application No. PCT/CN2016/083302, titled "ADVERTISEMENT PUSH SYSTEM, APPARATUS, AND METHOD", filed on May 25, 2016, which claims priority to Chinese Patent Application No. 201510374215.4 titled "ADVERTISEMENT PUSH SYSTEM, APPARATUS, AND METHOD" filed on Jun. 30, 2015 with the State Intellectual Property Office of the People's Republic of China, both of which are incorporated herein by reference in their entireties.

TECHNICAL FIELD

The present disclosure relates to the field of online multimedia, and in particular to an advertisement push system, apparatus and method.

BACKGROUND

With the rapid development of the Internet video industry, online video has become an important channel for people to get advices and entertainment.

A client device may generally play some advertisements while providing video services to users. For example, if a user selects a video to watch, multiple advertisements will be played at first, and then the video is played. As another example, during the process of playing a video, the video may be paused and multiple advertisements may be inserted into the video by the client device when the video is played to a preset time point, and video content after the preset time point will be continued to be played when the playing of the advertisements is finished. In general, the conventional advertisement push process is as follows. A preset number of advertisements are selected by a background server from an advertisement pool and the selected advertisements are provided to the client device; and accordingly, the advertisements provided by the background server are played by the client device in sequence.

As found by the inventors in the process of conceiving the present disclosure, at least the following issues exist in the conventional art. Advertisements provided by the background server are played by the client device simply according to selection of the background server, which will lead to a limited number of effective audiences, and a waste of advertising resources and bandwidth resources, and fail to meet viewing needs of a user.

SUMMARY

In order to address the issue of wasting advertisement resources and bandwidth resources and failing to meet the viewing needs of the user in the conventional art, it is provided an advertisement push system, apparatus and method in the embodiments of the present disclosure.

In a first aspect, an advertisement push system is provided. The system may include at least one client device and a background server. The background server is configured to provide the client device with a playing address of a foreground advertisement and preview materials of n candidate advertisements according to user characteristic information of a user of the client device, where n is a positive integer. The user characteristic information is configured to reflect basic personal information of the user and/or personal habits and use preferences of the user on a network. The client device is configured to play the foreground advertisement according to the playing address of the foreground advertisement. The client device is further configured to display the preview materials of all or some of the n candidate advertisements upon detection of a selection instruction triggered by the user during a process of playing the foreground advertisement. The client device is further configured to select at least one candidate advertisement from the n candidate advertisements for playing, in response to a selection operation of the user performed on the preview materials of the candidate advertisements.

In a second aspect, an advertisement push apparatus is provided, which is applied in a client device. The apparatus includes a foreground advertisement playing module configured to play a foreground advertisement according to a playing address of the foreground advertisement provided by a background server. The apparatus further includes a material displaying module configured to display preview materials of all or some of n candidate advertisements upon detection of a selection instruction triggered by a user during a process of playing the foreground advertisement, where n is a positive integer. The apparatus further includes a candidate advertisement selecting and playing module configured to select at least one candidate advertisement from the n candidate advertisements for playing, in response to a selection operation of the user performed on the preview materials of the candidate advertisements.

In a third aspect, an advertisement push apparatus is provided, which is applied in a background server. The apparatus includes a request receiving module configured to receive an advertisement acquisition request transmitted by a client device. The apparatus further includes an advertisement providing module configured to provide the client device with a playing address of a foreground advertisement and preview materials of n candidate advertisements in response to the advertisement acquisition request, where n is a positive integer. The advertisement acquisition request carries user characteristic information. The user characteristic information is configured to reflect basic personal information of a user and/or personal habits and use preferences of the user on a network.

In a fourth aspect, an advertisement push method is provided, which is applied in a client device. The method includes playing, by the client device, a foreground advertisement according to a playing address of the foreground advertisement provided by a background server. The method further includes displaying, by the client device, preview materials of all or some of the n candidate advertisements upon detection of a selection instruction triggered by a user during a process of playing the foreground advertisement, where n is a positive integer. The method further includes selecting, by the client device, at least one candidate advertisement from the n candidate advertisements for playing, in response to a selection operation of the user performed on the preview materials of the candidate advertisements.

In a fifth aspect, an advertisement push method is provided, which is applied in a background server. The method includes receiving, by the background server, an advertisement acquisition request transmitted by a client device. The method further includes providing, by the background server, a playing address of a foreground advertisement and preview materials of n candidate advertisements to the client device in response to the advertisement acquisition request, where n is a positive integer. The advertisement acquisition request carries user characteristic information. The user characteristic information is configured to reflect basic personal information of a user and/or personal habits and use preferences of the user on a network.

Multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

In order to illustrate the objects, technical solutions and advantages of the present disclosure more clearly, embodiments of the present disclosure will be described in detail in conjunction with the drawings.

Implementation Environment

Figure 1:
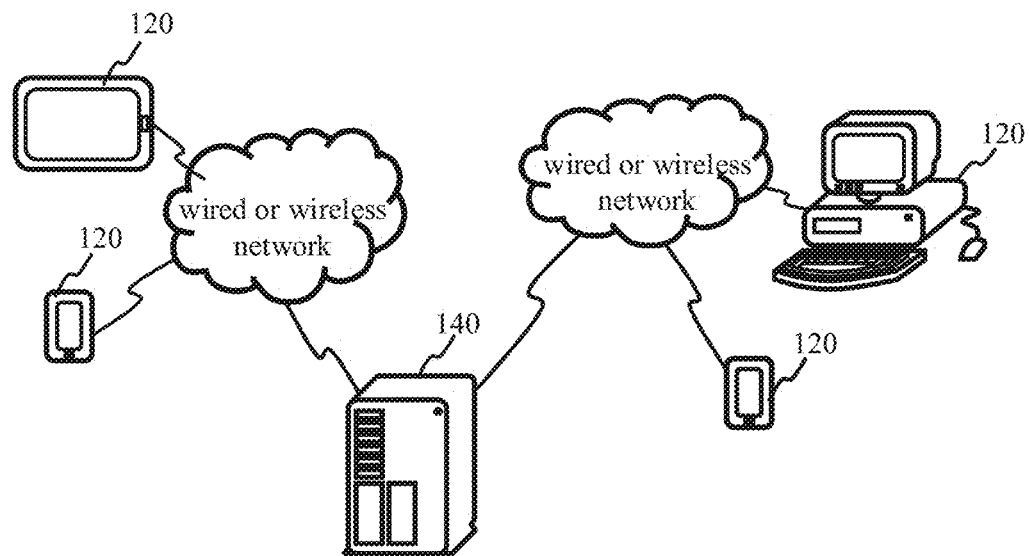
FIG. 1 is a schematic diagram showing an architecture of an implementation environment according to an embodiment of the present disclosure.

Reference is made to FIG. 1, which is a schematic diagram showing an architecture of an implementation environment according to an embodiment of the present disclosure. The implementation environment includes at least one terminal 120 and a background server 140.

A client device for providing network service runs in the terminal 120. For simplicity, the terminal in which the client device for providing network service runs is also referred to as a client device. Alternatively, the network service may be a multimedia service, such as a video service. The client device may be a video client device or a browser. The terminal 120 may be a mobile phone, a tablet computer, an electronic book reader, a multimedia player, a laptop portable computer, a desktop computer, a smart television, and the like.

The terminal 120 is connected with the background server 140 through a wired network or a wireless network.

The background server 140 is configured to provide advertisements to the client device running in the terminal 120. Generally, the advertisements are in a form of video, as well as other forms, such as an image and a text. The background server 140 may be one server, or a server cluster consisting of multiple servers, or a cloud computing service center.

Computer Architecture

Figure 2:
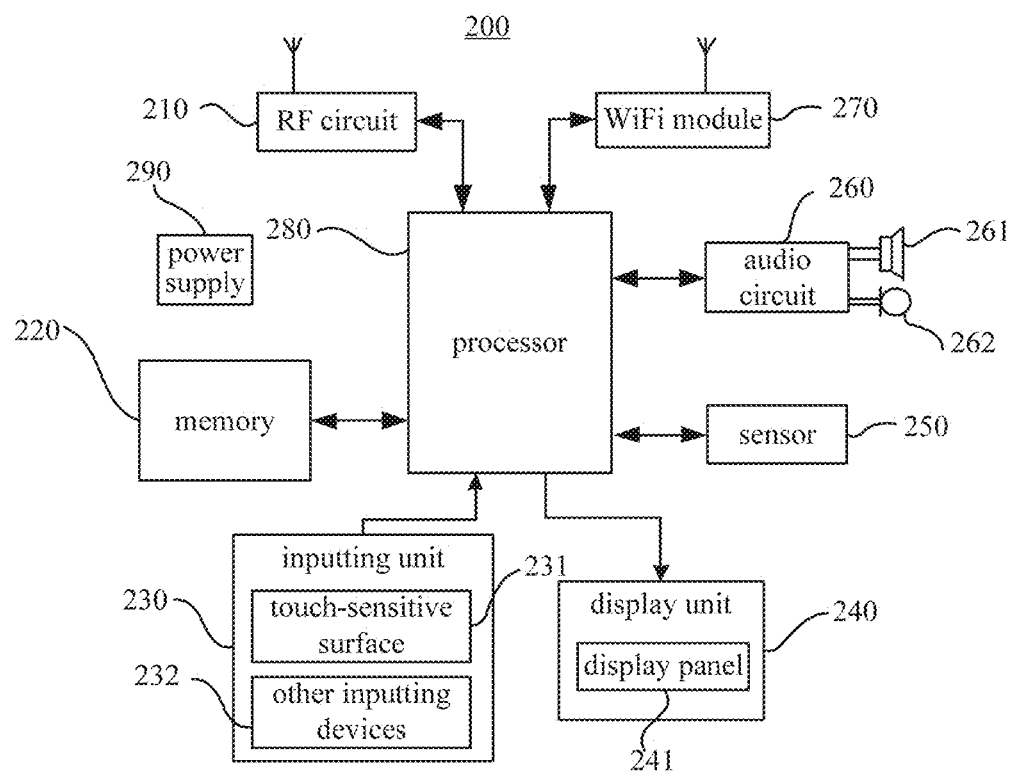
FIG. 2 is a schematic structural diagram of a terminal according to an embodiment of the present disclosure.

FIG. 2 is a schematic structural diagram of a terminal according to an embodiment of the present disclosure. A client device for providing network service may run in the terminal.

The terminal 200 may include a Radio Frequency (RF) circuit 210, a memory 220 including one or more computer-readable storage medium, an inputting unit 230, a display unit 240, a sensor 250, an audio circuit 260, a Wireless Fidelity (WiFi) module 270, a processor 280 including one or more processing core, a power supply 290 and the like. It should be understood by those skilled in the art that, the structure of the terminal shown in FIG. 2 does not intend to limit the terminal, and the terminal may include more or less components than those shown in FIG. 2, or any combination of those components, or a different arrangement of components.

Specifically, the RF circuit 210 may be configured to receive and transmit information, or to receive and transmit signals in the process of communication. Specifically, the RF circuit 210 is configured to receive downlink data from a base station and deliver the downlink data to the one or more processor 280 in FIG. 2 for processing. The RF circuit 210 is further configured to transmit uplink data to the base station. Generally, the RF circuit 210 includes but is not limited to an antenna, at least one amplifier, a tuner, one or more oscillator, a Subscriber Identity Module (SIM) card, a transceiver, a coupler, a Low Noise Amplifier (LNA), and a duplexer. In addition, the RF circuit 210 may communicate with other devices and networks via wireless communication. The wireless communication may be implemented based on any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 220 may be configured to store software programs and modules. The processor 280 is configured to execute various functional applications and data processing by running the software programs and modules stored in the memory 220. The memory 220 may mainly include a program storage area and a data storage area. The program storage area may be used to store an operating system, such as an application required by at least one function (for example, a voice playing function, an image playing function and the like). The data storage area may be used to store data (for example, audio data, telephone book and the like) generated due to the use of the terminal 200. In addition, the memory 220 may include a high-speed random access memory, and a nonvolatile memory, such as at least one magnetic disk memory, a flash memory, or other volatile solid-state memory. Correspondingly, the memory 220 may further include a memory controller configured to provide access to the memory 220 by the processor 280 and the inputting unit 230.

The inputting unit 230 may be configured to receive an inputted number or character information, and generate a signal related to user setting and function controlling, which is inputted with a keyboard, a mouse, an operating rod, an optical input or a trackball. Specifically, the inputting unit 230 may include an image inputting device 231. The image inputting device 231 may be a camera or a photoelectric scanning device. In addition to the image inputting device 231, the inputting unit 230 may further include other inputting devices 232. Specifically, the other inputting device 232 may include, but is not limited to, one or more of a physical keyboard, a function button (such as a volume controlling button or a switch button), a trackball, a mouse, an operating rod and so on.

The display unit 240 may be configured to display information inputted by the user or provided for the user, and various graphic user interfaces of the terminal 200. The graphic user interfaces may consist of graphs, text, icons, videos and any combination thereof. The display unit 240 may include a display panel 241. Optionally, the display panel 241 may be configured in a form of Liquid Crystal Display (LCD), Organic Light-Emitting Diode (OLED) or the like.

The terminal 200 may further include at least one type of sensor 250, such as a light sensor, a motion sensor and other sensor. Specifically, the light sensor may include an ambient light sensor and a proximity sensor. The ambient light sensor may adjust brightness of the display panel 241 based on brightness of ambient light, and the proximity sensor may close the display panel 241 or backlight in a case that the terminal 200 moves to an ear. As one type of motion sensor, a gravity acceleration sensor may detect magnitude of an accelerated speed in each of directions (there are usually three axes), detect magnitude and a direction of gravity while at rest, and be applied to an application which recognizes a gesture of the mobile phone (such as switching between portrait and landscape orientation, a related game or magnetometer calibration) and to a function related to vibration recognition (such as a pedometer or a click). In addition to the light sensor and the motion sensor, the terminal 200 may be provided with one or more of other sensors, such as a gyroscope, a barometer, a hygrometer, a thermometer or an infrared sensor, which is not described herein.

An audio circuit 260, a speaker 261 and a microphone 262 may be provided to provide an audio interface between the user and the terminal 200. The audio circuit 260 may convert received audio data into an electrical signal and transmit the electrical signal to the speaker 261. The speaker 261 converts the electrical signal into an audio signal for outputting. On the other hand, the microphone 262 converts a collected audio signal to an electrical signal, and transmits the electrical signal to the audio circuit 260. The audio circuit 260 converts the electrical signal into audio data, and outputs the audio data to the processor 280. The processor 280 processes the audio data, and transmits the processed audio data to the RF circuit 210, which in turn transmits it to another terminal for example. Alternatively, the processor 280 transmits the processed audio data to the memory 220 for further processing. The audio circuit 260 may include a headphone jack, so as to provide communications between a peripheral headphone and the terminal 200.

WiFi is a short-distance wireless transmission technology. By means of the WiFi module 270, the terminal 200 may help the user to receive and transmit emails, browse a webpage, and access to streaming media, thereby providing wireless broadband internet access for the user. Although the WiFi module 270 is illustrated in FIG. 2, it can be understood that, the wireless communication unit 270 is not a necessary constituent of the terminal 200, and may be omitted based on requirements without changing essence of the present disclosure.

The processor 280 is a control center of the terminal 200. The processor 280 connects respective components of the terminal 200 via various interfaces and circuits, and performs respective functions of the terminal 200, by running or executing the software programs or modules stored in the memory 220 and calling data stored in the memory 220, thereby realizing overall monitoring of the memory 220. Optionally, the processor 280 may include one or more processing cores. Preferably, the processor 280 is mainly configured to process operating systems, user interfaces and applications. In addition, a modem processor may be integrated in the processor 280. The modem processor may be configured to process wireless communications. It can be understood that, the modem processor may not be integrated into the processor 280, and be a portion of the terminal 200 which is independent of the processor 280.

The terminal 200 further includes the power supply 290 (such as a battery) configured to power all the components. Preferably, the power supply may be logically connected with the processor 280 via a power supply management system, so that management of functions such as charging, discharging and power managing, can be realized with the power supply management system. The power supply 290 may further include one or more direct current or alternating current power supplies, a rechargeable system, a power fault detection circuit, a power adapter or inverter, a power status indicator, and so on.

Not shown in the figure, however, the terminal 200 may further include a Bluetooth module for short-distance wireless communication, which is not described here.

Figure 3:
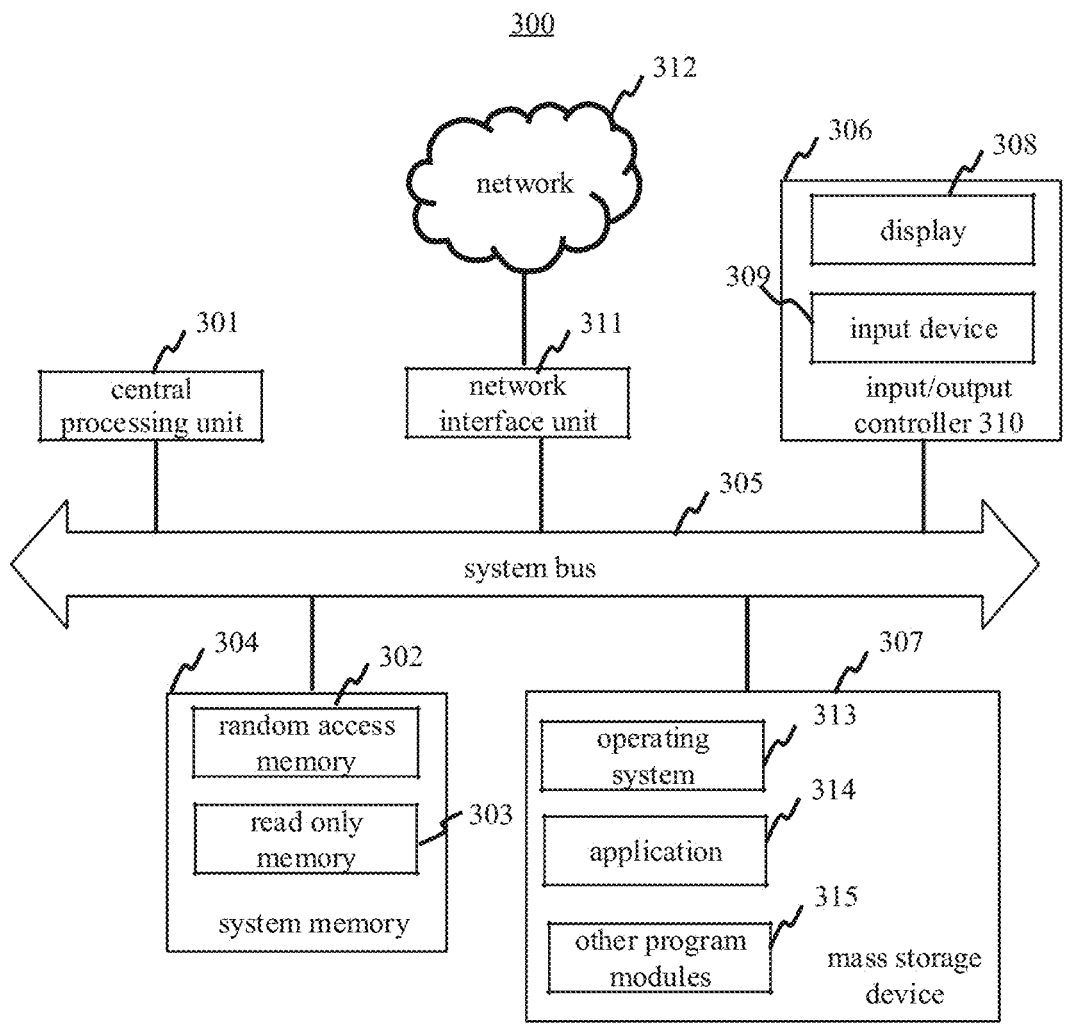
FIG. 3 is a schematic structural diagram of a server according to an embodiment of the present disclosure.

FIG. 3 is a schematic structural diagram of a server according to an embodiment of the present disclosure. The server may be a background server.

Specifically the server 300 includes a central processing unit (CPU) 301, a system memory 304 including a random access memory (RAM) 302 and a read only memory (ROM)

303, and a system bus 305 that connects the system memory 304 and the central processing unit 301. The server 300 further includes a basic input/output system (I/O system) 306 that facilitates information transmission between the various devices within the computer, and a mass storage device 307 for storing an operating system 313, an application 314 and other program modules 315.

The basic input/output system 306 includes a display 308 for displaying information and an input device 309 for inputting information by a user, such as a mouse or a keyboard.

The basic input/output system 306 may also include an input/output controller 310 connected with the system bus 305. The display 308 and the input device 309 each are connected with the central processing unit 301 via the system bus 305 through the input/output controller 310. The input output controller 310 is configured to receive and process input from other devices, such as a keyboard, a mouse or an electronic stylus. Similarly, the input/output controller 310 also provides output to a display screen, a printer or other output devices.

The mass storage device 307 is connected with the central processing unit 301 through a mass storage controller (not shown), which is in turn connected with the system bus 305. The mass storage device 307 and its associated computer-readable medium provide nonvolatile storage for the server 300. That is, the mass storage device 307 may include a computer-readable medium (not shown) such as a hard disk or a CD-ROM drive.

Without loss of generality, the computer-readable medium may include a computer storage medium and a communication medium. The computer storage medium includes volatile and nonvolatile, removable and non-removable medium implemented in any method or technique for storing information such as computer-readable instructions, data structures, program modules or other data information. The computer storage medium includes solid storage media, such as an RAM, an ROM, an EPROM, an EEPROM, or a flash memory; optical storage, such as a CD-ROM, or a DVD; and magnetic storage devices, such as a magnetic cassette, a magnetic tape, or a magnetic disk storage. Of course, those skilled in the art will recognize that the computer storage medium is not limited to those described above. The system memory 304 and the mass storage device 307 may be collectively referred to as a memory. The memory also includes one or more programs, and the one or more programs are stored in the memory and configured to be executed by the CPU 301.

According to embodiments of the present disclosure, the server 300 may also be operated by a remote computer connected with a network, such as the Internet. That is, the server 300 may be connected with a network 312 through a network interface unit 311, which in turn is connected with the system bus 305. Alternatively, the server 300 may be connected with other types of networks or remote computer systems (not shown) through the network interface unit 311.

Illustrative Embodiment

In the advertisement push scheme according to an embodiment of the present disclosure, the client device provides the user with the ability to select advertisement, instead of simply playing the advertisement provided by the background server merely according to the selection of the background server. According to the embodiment of the present disclosure, multiple candidate advertisements are obtained by the client device from the background server, and are provided to the user. Advertisements of interest may be selected by the user from the candidate advertisements for playing, according to his own need. Hereinafter the technical solutions according to the present disclosure will be described and illustrated in detail in conjunction with several embodiments.

Figure 4A:
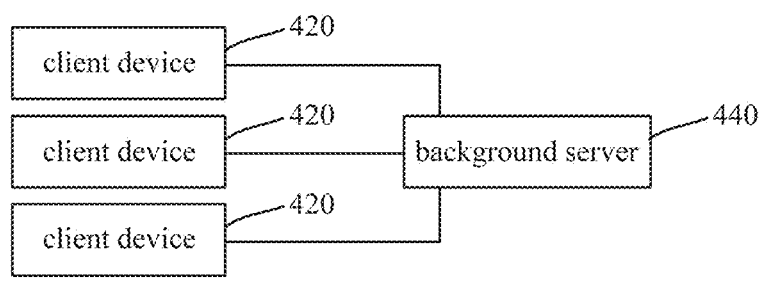
FIG. 4A is a block structural diagram of an advertisement push system according to an embodiment of the present disclosure.

FIG. 4A is a schematic diagram of an advertisement push system according to an embodiment of the present disclosure. The advertisement push system includes at least one client device 420 and a background server 440.

The background server 440 is configured to provide the client device 420 with a playing address of a foreground advertisement and preview materials of n candidate advertisements, where n is a positive integer. The foreground advertisement refers to an advertisement that is played by the client device side 420 before the advertisements selected from the n candidate advertisements are played. The candidate advertisement refers to an advertisement which is provided by the background server 440 to the user according to the needs of the user and which may be selected by the user. In a common case, the number of foreground advertisement may be one, which is not limited in the present disclosure. And the number of foreground advertisements may be multiple. The preview materials of a candidate advertisement may include preview information such as preview pictures and brief descriptions. In a case that the candidate advertisement is an advertisement in the form of a video, the preview pictures may be key frames extracted from a video stream of the candidate advertisement.

The background server 440 may receive an advertisement acquisition request transmitted by the client device 420, with the advertisement acquisition request carrying the user characteristic information. The background server 440 may determine a user type of the user based on the user characteristic information, select a foreground advertisement and n candidate advertisements from an advertisement pool based on the user type, and transmit a playing address of the foreground advertisement and preview materials of the n candidate advertisements to the client device 420.

The user characteristic information is configured to reflect basic personal information of the user and/or personal habits and use preferences of the user on a network. The user characteristic information may include user attribute data and/or historical behavior data. The user attribute data is configured to reflect the basic personal information of the user. The user attribute data may include but is not limited to at least one of a region, a gender, an age, a birthday, an IP address, a school, an education, an hobby, a work, a constellation, a zodiac and a blood type. The historical behavior data is configured to reflect personal habits and use preferences of the user on a network. The historical behavior data may include a record of a historical operation behavior generated by the user on a network. For example, the record may include but is not limited to a web browsing history, an online shopping record, a chat log and the like.

Multiple user types are provided in the background server 440 in advance, and a characteristic condition is set for each user type. For example, the correspondence between the user type and the characteristic condition may be as shown in table 1.

TABLE 1

| user type | characteristic condition |
|---|---|
| 1 | Gender: male; age: not limited; region: Guangdong; hobby: electronic product |
| 2 | Gender: female; age: not limited; region: Shanghai; hobby: cosmetics |
| 3 | Gender: not limited; age: 20-40; region: not limited; hobby: infant products |
| ... | ... |

After acquiring the user characteristic information, the background server 440 determines the characteristic condition matching the user characteristic information, and then determines the user type. In this embodiment, the background server 440 selects a foreground advertisement and candidate advertisements from an advertisement pool based on the user type.

In a possible implementation, the background server 440 may select a foreground advertisement from advertisements that match the user type, select a candidate advertisements from the advertisements that match the user type, and select b candidate advertisements from advertisement that do not match the user type. Where a+b=n, and a, b are positive integers.

The user types and the matching advertisements are stored in the background server 440 in advance. For any of the user types, the matching advertisement is an advertisement that matches the characteristics of the user group corresponding to the user type. In a possible implementation, considering that the foreground advertisement is the advertisement that must be played by the client device 420, the advertisement matching the user characteristic is selected as the foreground advertisement. Further, among the selected candidate advertisements, some are advertisements that match the user characteristic, and the others are advertisements that do not match the user characteristic. In this case, different needs of multiple users will be met if a terminal is shared by the multiple users, so that each user may find advertisements meeting their own needs.

Herein the client device 420 plays the foreground advertisement according to the playing address of the foreground advertisement. Alternatively, the client device 420 may be further configured to display prompt information during the process of playing the foreground advertisement, and the prompt information is configured to prompt the user to trigger the advertisement selection in a certain manner. The manner includes but is not limited to any one of a shaking operation, a touch operation, a voice recognition and image recognition. The prompt information may be displayed on the client device 420 in a form of text and/or image.

Figure 4B:
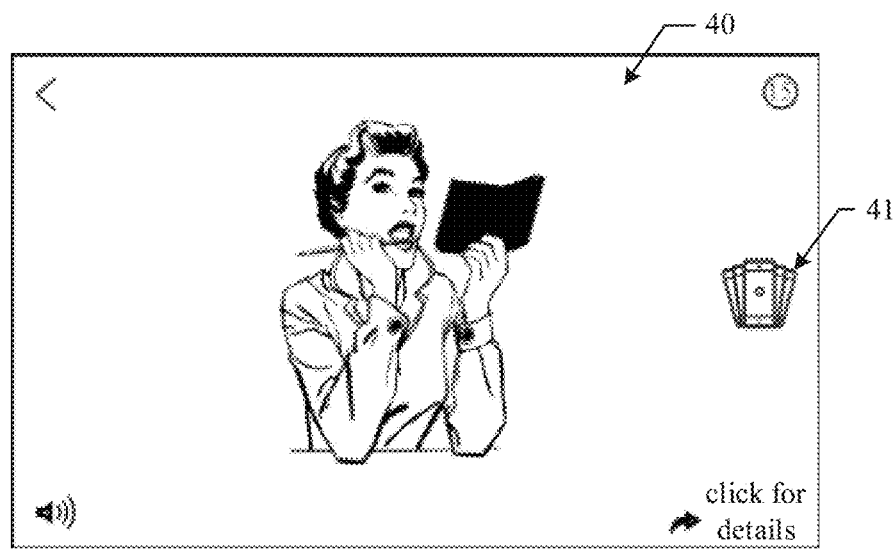
FIGS. 4B to 4D are diagrams illustrating interfaces according to embodiments of the present disclosure.

For example, as shown in FIG. 4B, the client device 420 displays a "shaking" icon 41 in a form of a floating layer on a foreground advertisement playing interface 40, so as to prompt the user to trigger a selection instruction by shaking the terminal. Alternatively, the client device 420 may display a text prompt near the "shaking" icon 41. For example, the text prompt may be ""shaking" to select the advertisement of interest", which is to prompt the user more clearly.

The client device is further configured to display preview materials of all or some of n candidate advertisements upon detection of a selection instruction triggered by the user during a process of playing the foreground advertisement.

Alternatively, the selection instruction is triggered by the user by shaking the terminal. For example, whether the user shakes the terminal may be detected by a sensor built in the terminal. Alternatively, the selection instruction is triggered by the user through the touch operation. For example, the terminal may be a device provided with a touch screen, and the user may trigger the selection instruction by touch operations such as touching, or sliding. Alternatively, the selection instruction is triggered by the user through the voice signal. For example, the collected voice signal may be identified by the client device through the voice recognition technology. Preview materials of all or some of the candidate advertisements are displayed in a case that the recognition result satisfies preset voice recognition requirements. Alternatively, the selection instruction is triggered by the user through the image signal. For example, the gesture track or the face image of the user may be identified by the client device through the image recognition technology. Preview materials of all or some of the candidate advertisements are displayed in a case that the recognition result satisfies preset image recognition requirements.

The client device 420 may display the preview materials of the candidate advertisements in the following manner.

Figure 4C:
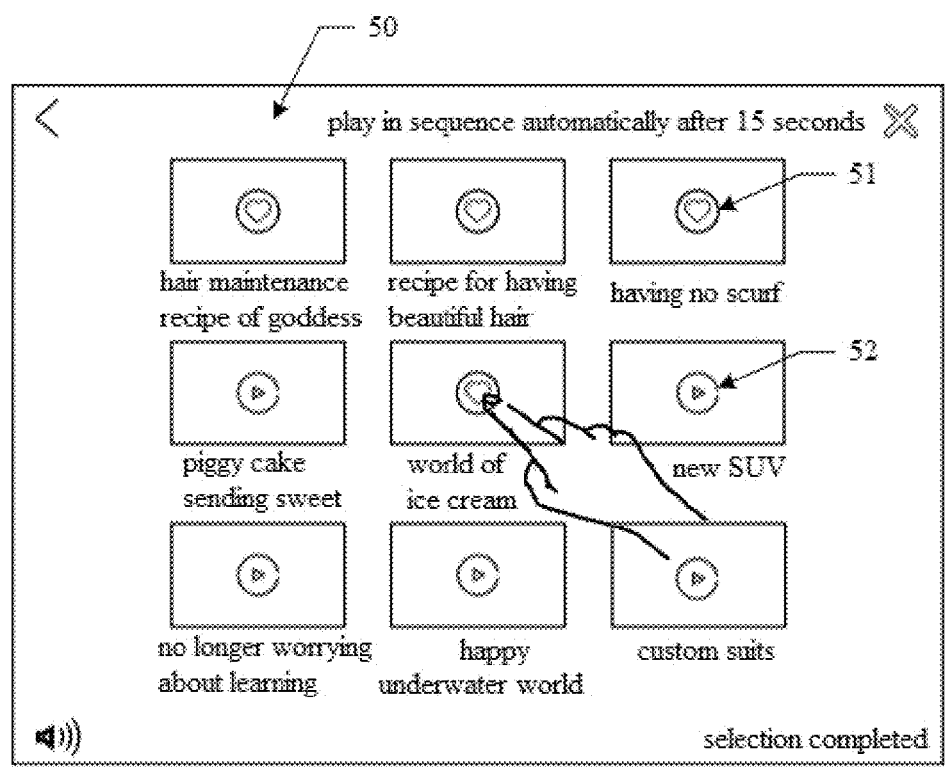

In a possible implementation, a whole or a part of a general preview page is displayed by the client device 420. The preview materials of n candidate advertisements are displayed on the general preview page at a same time. The whole general preview page is displayed on the client device 420 in a case that the area of the general preview page is smaller than or equal to the display area of the display screen of the terminal. For example, as shown in FIG. 4C, the number n of the candidate advertisements is 9, and the preview materials of the 9 candidate advertisements are displayed on the same one user interface 50 at a same time by the client device 420. In a case that the area of the general preview page is larger than the display area of the screen of the terminal, a part of the general preview page is displayed on the client device 420. Other parts of the general preview page will be displayed on the client device 420 when a translation instruction is received by the client device 420 from the user.

In this embodiment, no limitation is provided on the arrangement of the preview materials of the n candidate advertisements displayed at a same time. The arrangement may be in a form of a regular tile, such as a display array in rows and columns, a honeycomb tile display; or in a form of an irregular tile, such as a random position display. The preview materials of each of the candidate advertisements usually do not overlap with each other.

Figure 4D:
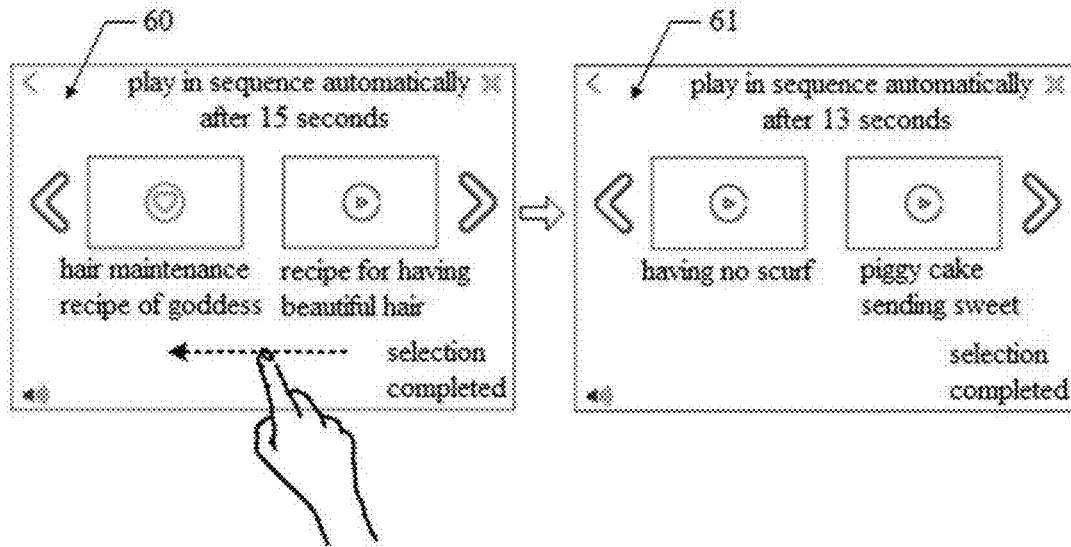

In another possible implementation, the client device 420 display one of multiple preview pages, and each of the multiple preview pages displays the preview materials of at least one of the n candidate advertisements. A first one of the multiple preview pages is firstly displayed by the client device 420. On reception of a switching operation of the user, the first preview page is switched to a second preview page by the client device 420 according to the received switching operation. The first preview page and the second preview page refer to any two preview pages which are adjacent to each other among the multiple preview pages. For example, as shown in FIG. 4D, it is assumed that the number n of the candidate advertisements is 8, the number of the preview pages is 4, and preview materials of two candidate advertisements are displayed in each of the preview pages. A first preview page 60 is firstly displayed by the client device 420, and preview materials of a first and a second candidate advertisement are displayed in the first preview page 60. On reception of a left slide operation of the user, a second preview page 61 is displayed by the client device 420, and preview materials of a third and a fourth candidate advertisements are displayed in the second preview page 61. Similarly, switching between different preview pages may be achieved by sliding left or right by the user.

Of course, it will be appreciated by those skilled in the art that other manners of displaying preview materials of candidate advertisements may be used, which is not defined in the present disclosure.

The client device 420 may be further configured to select at least one candidate advertisement from the n candidate advertisements for playing, in response to a selection operation of the user. An advertisement of interest may be selected by the user for viewing based on the preview materials of the candidate advertisements displayed by the client device 420.

As an example, the client device provides the user with an interface for selecting the preview materials, to select candidate advertisements corresponding to the preview materials selected by the user. Herein the user may click preview materials of a candidate advertisement displayed in the client device by a click of a mouse or a finger, so as to select the candidate advertisement. In a case that a candidate advertisement has been selected, the selection of the candidate advertisement may be canceled by clicking the preview materials of the candidate advertisement. For example, different identifiers may be used herein to distinguish selection status of the candidate advertisements. Alternatively, a corresponding selection box may be provided for each preview materials, for selecting the candidate advertisement corresponding to each preview material by the user. Herein the specific selection manners are not limited.

The client device 420 may obtain a display time duration of the preview materials of the candidate advertisement. The client device 420 may determine whether a number k of the candidate advertisements that have been selected by the user is less than a preset threshold q when the display time duration reaches a preset time duration, where k is an integer greater than or equal to 0 and q is an integer greater than 0. The client device 420 may select q-k candidate advertisements automatically from the candidate advertisements that have not been selected by the user, and play the k candidate advertisements selected by the user and the q-k automatically selected candidate advertisements, in a case that k<q. The client device 420 may play k candidate advertisements selected by the user in a case that k≥q.

In this embodiment, the preset time duration may be set to 15 seconds in order to prevent the user from spending too much time in the process of selecting the advertisements. The client device 420 counts from the time when the preview materials of the candidate advertisement are displayed. When the preset time duration is expired, the client device 420 judges whether the number k of the candidate advertisements that have been selected by the user is smaller than the preset threshold q, where q is a preset minimum number of the advertisements that need to be played. For example, q may be set to 4 in advance. q candidate advertisements are automatically selected by the client device 420 for the user to improve the selection efficiency in a case that k<q. The client device 420 directly plays the k candidate advertisements selected by the user in a case that k≥q.

In a case that the displaying time duration of the candidate materials has not been reached the preset time duration, the client device 420 directly performs the above determination that whether the number k of the candidate advertisements that have been selected by the user is less than the preset threshold q if a selection completion instruction triggered by the user is detected by the client device 420, without waiting until the displaying time duration has reached the preset time duration, thereby further reducing the time taken for the user to select the advertisements.

This embodiment also provides a mechanism for dynamically learning and adjusting user characteristics in response to the selection operation of the user for candidate advertisements. Specifically, the client device 420 may be further configured to generate operational record information based on the selection operation. The operational record information is configured to reflect a selection sequence and a selection result of the candidate advertisement by the user. The client device 420 may then transmit the operational record information to the background server 440. In this case, the background server 440 may be further configured to re-determine the user type based on the operational record information.

In view of the above, with the advertisement push system according to this embodiment, multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

In addition, through the background server, multiple advertisements matching the user type are provided to the client device as some of the candidate advertisements, and multiple advertisements that do not match the user type are provided to the client device as the other ones of the candidate advertisements. In this case, different needs of multiple users will be met if a terminal is shared by the multiple users, so that each user may find advertisements meeting their own needs.

In addition, the operational record information of the selection operation of the user performed on the candidate advertisement is transmitted by the client device to the background server. The user type is re-determined by the background server according to the operational record information, thereby achieving a dynamic learning and adjustment of the user characteristic, and further improving the accuracy of advertisement pushing.

In order to illustrate the embodiment of the present disclosure more clearly, the operation principle of the advertisement push system according to the embodiment of the present disclosure will be described with a method embodiment of the present disclosure.

Figure 5:
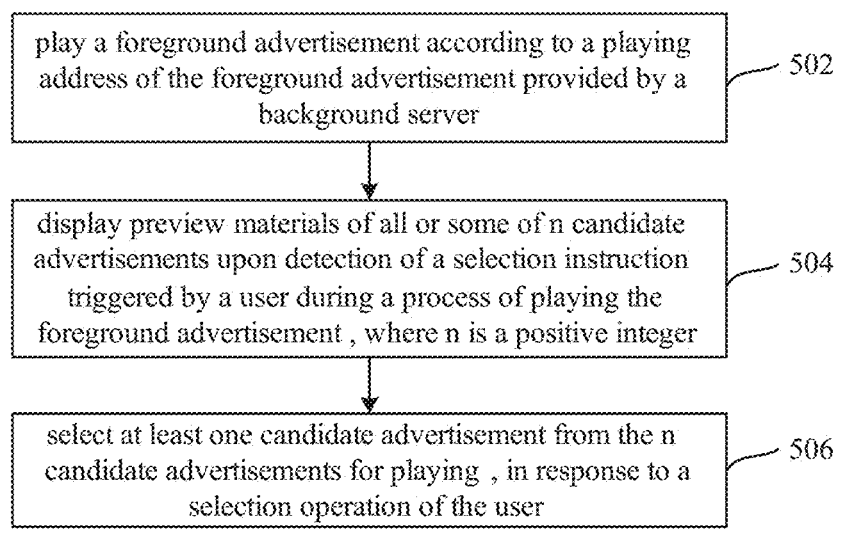
FIG. 5 is a flowchart of an advertisement push method according to an embodiment of the present disclosure.

FIG. 5 is a flowchart of an advertisement push method according to an embodiment of the present disclosure. The advertisement push method may be applied to a client device. The advertisement push method may include the following steps 502, 504 and 506.

In step 502, a foreground advertisement is played according to a playing address of the foreground advertisement provided by a background server.

In step 504, the preview materials of all or some of n candidate advertisements are displayed upon detection of a selection instruction triggered by a user during a process of playing the foreground advertisement, where n is a positive integer.

In step 506, at least one candidate advertisement is selected from the n candidate advertisements for playing, in response to a selection operation of the user.

In view of the above, with the advertisement push method according to this embodiment, multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided, by the client device, with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

Figure 6:
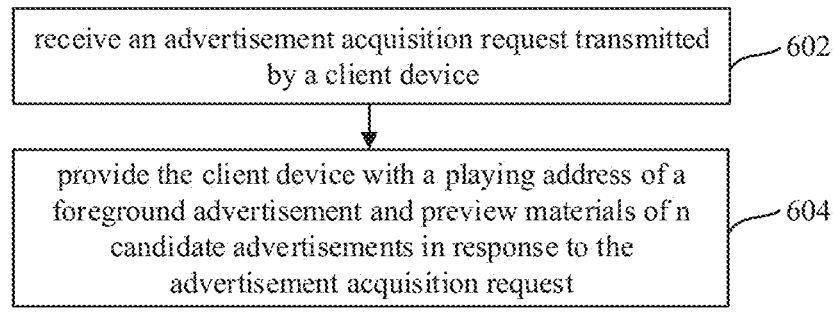
FIG. 6 is a flowchart of an advertisement push method according to an embodiment of the present disclosure.

Reference is made to FIG. 6, which is a flowchart of an advertisement push method according to another embodiment of the present disclosure. The advertisement push method may be applied to a background server. The advertisement push method may include the following steps 602 and 604.

In step 602, an advertisement acquisition request transmitted by a client device is received.

In step 604, a playing address of a foreground advertisement and preview materials of n candidate advertisements are provided to the client device in response to the advertisement acquisition request, where n is a positive integer.

The client device is further configured to display preview materials of all or some of the n candidate advertisements upon detection of a selection instruction triggered by the user during a process of playing the foreground advertisement according to the playing address of the foreground advertisement. The client device is further configured to select at least one candidate advertisement the n candidate advertisements for playing, in response to a selection operation of the user.

In view of the above, with the advertisement push method according to this embodiment, multiple candidate advertisements are provided by the background server to the client device, and are in turn provided by the client device to the user for selecting. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

Figure 7A:
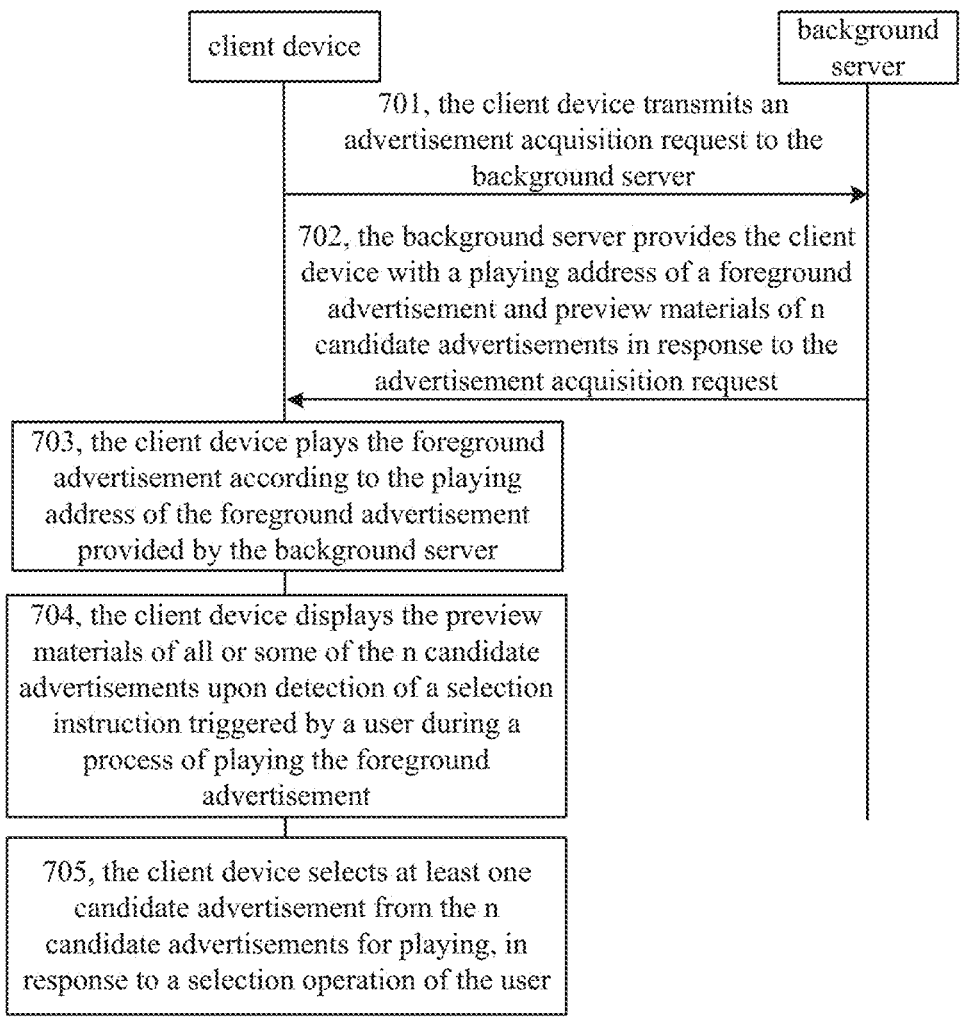
FIG. 7A is a flowchart of an advertisement push method according to an embodiment of the present disclosure.

Reference is made to FIG. 7A, which is a flowchart of an advertisement push method according to another embodiment of the present disclosure. The advertisement push method may be applied to the implementation environment shown in FIG. 1. The advertisement push method may include the following steps 701 to 705.

In step 701, an advertisement acquisition request is transmitted by the client device to the background server.

The advertisement acquisition request is configured to acquire an advertisement from the background server.

In this embodiment, the time for transmitting an advertisement acquisition request to the client device is not specifically limited. For example, the client device may transmit an advertisement acquisition request to the background server after startup, or transmit an advertisement acquisition request to the background server after the user logs in using the user account, or transmit an advertisement acquisition request to the background server in the process of providing the network service to the user. In an example, by taking a video client device as an example, the video client device transmits an advertisement acquisition request to the background server upon detection of a video playing instruction triggered by the user, so as to play multiple advertisements before playing the video selected by the user. Alternatively, during the process of playing the video, the video client device transmits an advertisement acquisition request to the background server before a preset point in time, so as to insert multiple advertisements at the preset point in time.

The advertisement acquisition request carries user characteristic information. The user characteristic information is configured to reflect basic personal information of the user and/or personal habits and use preferences of the user on a network. The user characteristic information may include user attribute data and/or historical behavior data. The user attribute data is configured to reflect the personal basic information of the user. The user attribute data may include but is not limited to at least one of a region, a gender, an age, a birthday, an IP address, a school, an education, an hobby, a work, a constellation, a zodiac and a blood type. The historical behavior data is configured to reflect personal habits and use preferences of the user on a network. The historical behavior data may include a record of a historical operation behavior generated by the user on a network. For example, the record may include but is not limited to a web browsing history, an online shopping record, a chat log and the like.

Of course, in other possible implementations, a correspondence between the user account and the user characteristic information may be stored in advance in the background server. In this manner, the advertisement acquisition request transmitted by the client device to the background server only needs to carry the user account. Accordingly, by querying the correspondence, the background server may obtain the user characteristic information corresponding to the user account.

Accordingly, the advertisement acquisition request transmitted by the client device is received by the background server.

In step 702, a playing address of a foreground advertisement and preview materials of n candidate advertisements are provided by the background server to the client device in response to the advertisement acquisition request, where n is a positive integer.

The foreground advertisement refers to an advertisement that is played by the client device side 420 before the advertisements selected from the n candidate advertisements are played. The candidate advertisement refers to an advertisement which is provided by the background server 440 to the user according to the needs of the user and which may be selected by the user. In a common case, the number of foreground advertisement may be one, which is not limited in this embodiment. The preview materials of a candidate advertisement may include preview information such as preview pictures and brief descriptions. In a case that the candidate advertisement is an advertisement in the form of a video, the preview pictures may be key frames extracted from a video stream of the candidate advertisement.

Figure 7B:
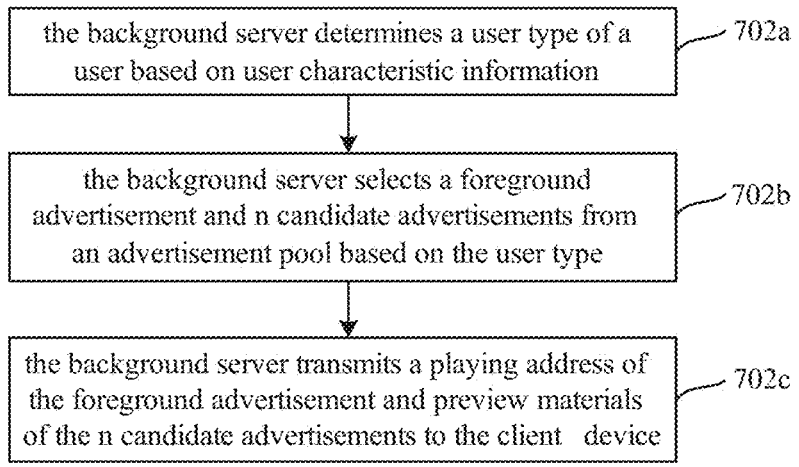
FIG. 7B is a flowchart of step 702 according to an embodiment of the present disclosure.

In a case that the user characteristic information is carried in the advertisement acquisition request, step 702 may include the following sub-steps 702*a* to 702*c* as shown in FIG. 7B.

In step 702*a*, a user type of the user is determined by the background server based on the user characteristic information.

Multiple user types are provided in the background server in advance, and a characteristic condition is set for each user type. For example, the correspondence between the user type and the characteristic condition may be as shown in table 1 described above. After obtaining the user characteristic information, the background server determines the matching characteristic condition, and determines the user type according to the correspondence relationship.

In step 702*b*, a foreground advertisement and n candidate advertisements are selected by the background server from an advertisement pool based on the user type.

The user types and the matching advertisements are stored in the background server in advance. For any of the user types, the matching advertisement is an advertisement that matches the characteristics of the user group corresponding to the user type. The background server may provide the user with advertisements that match the user characteristics by selecting advertisements that match the user type from the advertisement pool.

In a possible implementation, the background server may select a foreground advertisement from advertisements that match the user type, select a candidate advertisements from the advertisements that match the user type; and select b candidate advertisements from advertisements that do not match the user type, where a+b=n, and a, b are positive integers.

In this possible implementation, considering that the foreground advertisement is the advertisement that must be played by the client device, the advertisement matching the user characteristic is selected as the foreground advertisement. Further, among the selected candidate advertisements, some are advertisements which match the user characteristic, and the other others are advertisements which do not match the user characteristic. In this case, different needs of multiple users will be met if a terminal is shared by the multiple users, so that each user may find advertisements meeting their own needs.

In an example in which multiple family members share one terminal, the user characteristics of the multiple family members are not the same, such as gender, age, and hobby. These family members often use the same user account to log in to the client device. If only the advertisements which match the user type corresponding to the user account are provided to the client device, it will inevitably lead to a single type of pushed advertisement, failing to meet the different needs of multiple family members. Therefore, among the selected candidate advertisements, some are advertisements which match the user characteristic and the others are advertisements which do not match the user characteristic. Thus, issue of low pushed advertisement accuracy caused by multiple family members sharing one terminal can be addressed, so as to meet the different needs of multiple family members.

In step 702*c*, a playing address of the foreground advertisement and preview materials of the n candidate advertisements are transmitted to the client device by the background server.

Because the foreground advertisement is an advertisement that must be played by the client device, the background server transmits the playing address of the foreground advertisement directly to the client device. Candidate advertisements are advertisements that are provided for selecting by the user. The background server transmits the preview materials of the candidate advertisements to the client device, so that the user can select the advertisements of interest based on the preview materials.

The background server may transmit the playing addresses of the n candidate advertisements to the client device directly. However, considering that some the n candidate advertisements may not be selected for playing, the background server does not transmit playing addresses of the n candidate advertisements to the client device in order to save the transmission resource. Instead, after the candidate advertisement to be played has been selected by the client device, the playing address of the candidate advertisement to be played is transmitted to the client device.

Accordingly, a playing address of the foreground advertisement and preview materials of the n candidate advertisements transmitted by the background server are received by the client device.

In step 703, a foreground advertisement is played by the client device according to a playing address of the foreground advertisement provided by a background server.

A prompt message is displayed by the client device during the process of playing the foreground advertisement, and the prompt message is configured to prompt the user to trigger the advertisement selection in a certain manner. The manner includes but is not limited to any one of a shaking operation, a touch operation, a voice recognition and image recognition. The prompt information may be displayed on the client device in a form of text and/or image.

Referring to FIG. 4B, the client device displays a "shaking" icon 41 in a form of a floating layer on a foreground advertisement playing interface 40, so as to prompt the user to trigger an advertisement selection by shaking the terminal. Alternatively, the client device may display a text prompt near the "shaking" icon 41. For example, the text prompt may be ""shaking" to select the advertisement of interest", which is to prompt the user more clearly.

In step 704, preview materials of all or some of n candidate advertisements are displayed by the client device upon detection of a selection instruction triggered by the user during a process of playing the foreground advertisement.

Alternatively, the selection instruction is triggered by the user by shaking the terminal. For example, whether the user shakes the terminal may be detected by a sensor built in the terminal. Alternatively, the selection instruction is triggered by the user through the touch operation. For example, the terminal may be a device provided with a touch screen, and the user may trigger the selection instruction by touch operations such as touching, or sliding. Alternatively, the selection instruction is triggered by the user through the voice signal. For example, the collected voice signal may be identified by the client device through the voice recognition technology. Preview materials of all or some of the candidate advertisements are displayed in a case that the recognition result satisfies preset voice recognition requirements. Alternatively, the selection instruction is triggered by the user through the image signal. For example, the gesture track or the face image of the user may be identified by the client device through the image recognition technology. Preview materials of all or some of the candidate advertisements are displayed in a case that the recognition result satisfies preset image recognition requirements. Of course, the triggering modes of the selection instructions described above are merely examples, and it will be appreciated by those skilled in the art that the selection instructions may be triggered in any suitable manner, so as to facilitate the user to select the preview materials on the client device.

As an example, the client device may display the preview materials of the candidate advertisements in the following manner.

In a possible implementation, a whole or a part of a general preview page is displayed by the client device. The preview materials of n candidate advertisements are displayed on the general preview page at a same time. The whole general preview page is displayed on the client device in a case that the area of the general preview page is smaller than or equal to the display area of the display screen of the terminal. For example, as shown in FIG. 4C, the number n of the candidate advertisements is 9, and the preview materials of the 9 candidate advertisements are displayed on the same one user interface 50 at a same time by the client device. In a case that the area of the general preview page is larger than the display area of the screen of the terminal, a part of the general preview page is displayed on the client device. When a translation instruction is received by the client device from the user, other area of the general preview page is moved to for displaying on the client device 420.

In this embodiment, no limitation is provided on the arrangement of the preview materials of the n candidate advertisements displayed at a same time. The arrangement may be in a form of a regular tile, such as a display array in rows and columns, a honeycomb tile display; or in a form of an irregular tile, such as a random position display. The preview materials of each of the candidate advertisements usually do not overlap with each other.

In another possible implementation, the client device display one of multiple preview pages, and each of the multiple preview pages displays the preview materials of at least one of the n candidate advertisements. A first one of the multiple preview pages is firstly displayed by the client device. On reception of a switching operation of the user, the first preview page is switched to a second preview page by the client device according to the received switching operation. The first preview page and the second preview page refer to any two preview pages which are adjacent to each other among the multiple preview pages. For example, as shown in FIG. 4D, it is assumed that the number n of the candidate advertisements is 8, the number of the preview pages is 4, and preview materials of two candidate advertisements are displayed in each of the preview pages. A first preview page 60 is firstly displayed by the client device, and preview materials of a first and a second candidate advertisement are displayed in the first preview page 60. On reception of a left slide operation of the user, a second preview page 61 is displayed by the client device, and preview materials of a third and a fourth candidate advertisements are displayed in the second preview page 61. Similarly, switching between different preview pages may be achieved by sliding left or right by the user.

It will be appreciated by those skilled in the art that the manner of displaying the preview materials is only an example, which is not intended to limit the present disclosure. The preview page may be displayed using any suitable display and switching method by those skilled in the art according to actual needs.

In step 705, at least one candidate advertisement is selected from the n candidate advertisements for playing by the client device in response to a selection operation of the user.

The user may select the preview materials of interest based on the preview materials of the candidate advertisements displayed by the client device, so as to achieve a selection of the candidate advertisement corresponding to the preview materials.

The client device may display a first identifier which is configured to indicate a candidate advertisement that has been selected by the user, and a second identifier which is configured to indicate a candidate advertisement that has not been selected by the user. In this way, based on the first and second identities, the user can distinguish which candidate advertisements have been and which the candidate advertisements have not been selected.

For example, as shown in FIG. 4C, a heart mark 51 is superimposed and displayed on the preview materials of the candidate advertisements that have been selected by the user, and a triangular logo 52 is superimposed and displayed on the preview materials of the candidate advertisements which have not been selected by the user. The client device switches the triangular mark 52 corresponding to a candidate advertisement to the heart mark 51 when the selection operation corresponding to the candidate advertisement is acquired.

Figure 7C:
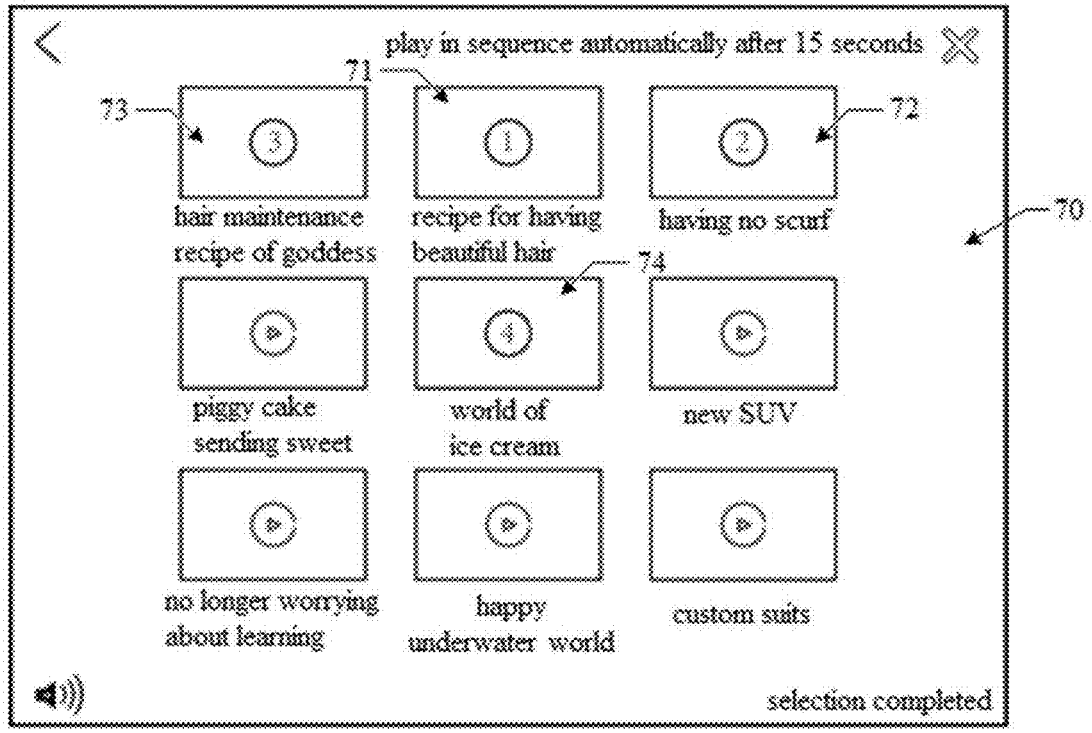
FIG. 7C is a diagram illustrating an interface according to an embodiment of the present disclosure.

Alternatively, the client device may display a selection sequence for the candidate advertisements that have been selected by the user. For example, referring to FIG. 7C, a user interface 70 displayed in the client device includes preview materials of multiple candidate advertisements. For example, candidate advertisements 71, 72, 73 and 74 are selected in sequence. Instruction information indicative of a selection sequence, such as "1", "2", "3" and "4" shown in the figure, is superimposed and displayed on the preview materials of each of the candidate advertisements according to the selection sequence.

Figure 7D:
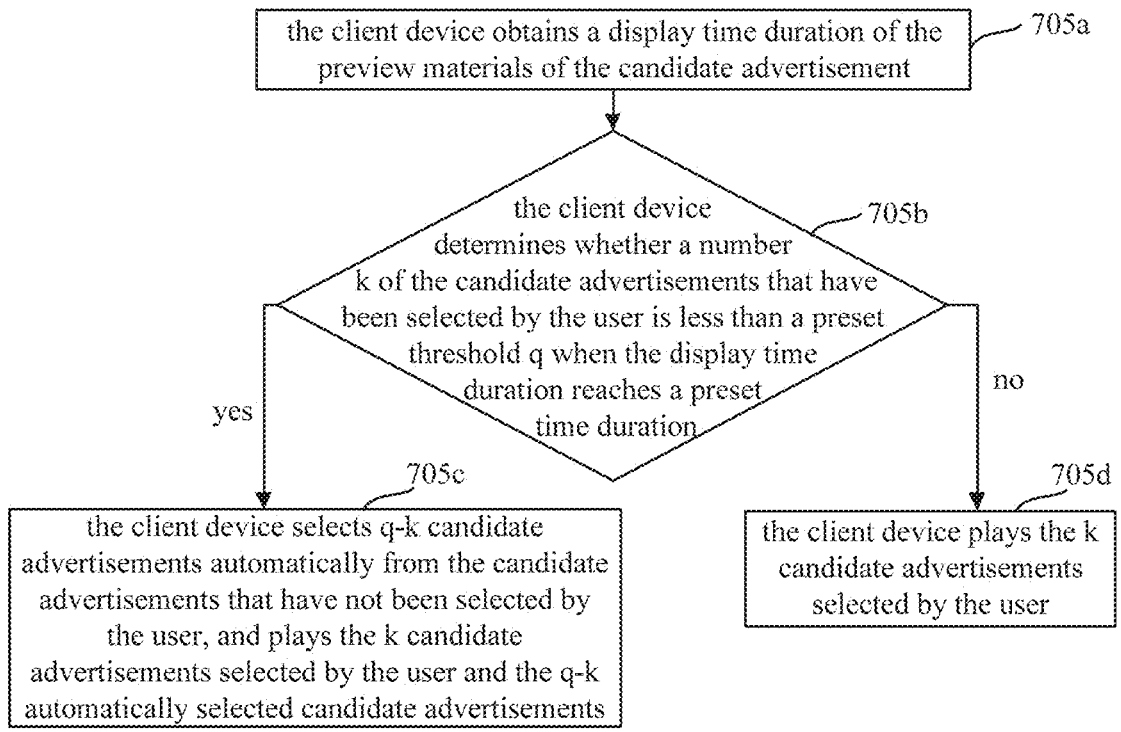
FIG. 7D is a flowchart of step 705 according to an embodiment of the present disclosure.

In a possible implementation, referring to FIG. 7D, step 705 may include the following sub-steps 705a to 705d.

In step 705a, a display time duration of the preview materials of the candidate advertisement is obtained by the client device.

In step 705b, it is determined by the client device whether a number k of the candidate advertisements that have been selected by the user is less than a preset threshold q in a case that the display time duration reaches a preset time duration, where k is an integer greater than or equal to 0 and q is an integer greater than 0.

If yes, the process proceeds to step 705c; otherwise, the process proceeds to step 705d.

In step 705c, q-k candidate advertisements are selected automatically by the client device from the candidate advertisements that have not been selected by the user, and the k candidate advertisements selected by the user and the q-k automatically selected candidate advertisements are played.

In step 705d, k candidate advertisements selected by the user are played by the client device.

A preset time duration is set in order to prevent the user from spending too much time in the process of selecting the advertisements. For example, the preset time duration can be set to 15 seconds. The client device counts from the time when the preview materials of the candidate advertisement are displayed. When the preset time duration is expired, the client device judges whether the number k of the candidate advertisements that have been selected by the user is smaller than the preset threshold q, where q is a preset minimum number of the advertisements that need to be played. For example, q may be set to 4 in advance. q candidate advertisements are automatically selected by the client device for the user to improve the selection efficiency in a case that k<q. The client device directly plays k candidate advertisements selected by the user in a case that k≥q.

As an example, an interface indicative of selection completion may be provided on the preview page of the material displayed on the client device. In a case that the displaying time duration of the candidate materials has not been reached the preset time duration, the client device directly performs the above determination that whether the number k of the candidate advertisements that have been selected by the user is less than the preset threshold q if a selection completion instruction triggered by the user is detected by the client device, without waiting until the displaying time duration has reached the preset time duration, thereby further reducing the time taken for the user to select the advertisements.

In addition, in this embodiment, a playing order of the candidate advertisements selected by the user and/or by the client device itself is not specifically limited. For example, the playing order may be determined according to the selection sequence, or may be determined randomly, or may be determined based on a default sorting parameter, which may be at least one of a click rate, an advertisement order price and a time that the advertisement has already been pushed.

In addition, the client device may play the candidate advertisements selected by the user and/or by the client device itself after the playing of the previously unfolded foreground advertisement has been completed; or the client device may play the candidate advertisements selected by the user and/or by the client device itself directly, which is not limited by this embodiment.

In addition, when the background server transmits the preview materials of the n candidate advertisements to the client device, together with the playing address of the n candidate advertisements, so that the candidate advertisements which are determined to be played may directly be played by the client device based on the playing address. Alternatively, after determining the candidate advertisement to be played, the client device transmits a playing address acquisition request to the background server, with the playing address acquisition request carrying the identification information of the candidate advertisement to be played. Accordingly, the background server obtains the playing address of the candidate advertisement to be played according to the identifier information, and transmits it to the client device. The client device plays the candidate advertisement to be played according to the received playing address.

The client device may further generate operational record information based on the selection operation. The operational record information is configured to reflect a selection sequence and a selection result of the candidate advertisement by the user. And then operational record information is transmitted by the client device to the background server. Accordingly, the background server receives the operational record information transmitted by the client device and re-determines the user type of the user according to the operational record information.

In this embodiment, since the selection sequence and the selection result of the candidate advertisement by the user reflect the degree of interest of the user to each advertisement, dynamic learning and adjustment of the user characteristic are realized through the above steps, further improving the advertisement pushing accuracy.

In view of the above, with the advertisement push method according to this embodiment, multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

In addition, through the background server, multiple advertisements matching the user type are provided to the client device as some of the candidate advertisements, and multiple advertisements that do not match the user type are provided to the client device as the other ones of the candidate advertisements. In this case, different needs of multiple users will be met if a terminal is shared by the multiple users, so that each user may find advertisements meeting their own needs.

In addition, the operational record information of the selection operation of the user performed on the candidate advertisement is transmitted by the client device to the background server. The user type of the user is re-determined by the background server according to the operational record information, thus dynamic learning and adjustment of the user characteristic are realized, further improving the advertisement pushing accuracy.

It should be noted that steps related to the client device in the above embodiment may be implemented separately as an advertisement push method on the client device side, and steps related to the background server can be separately implemented as an advertisement push method on the background server side.

Hereinafter an apparatus embodiment according to the present disclosure is given, and the corresponding method embodiment may be referred to for details which are not described in detail in the apparatus embodiment.

Figure 8:
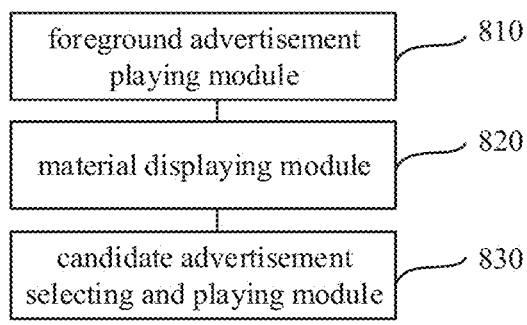
FIG. 8 is a block structural diagram of an advertisement push apparatus according to an embodiment of the present disclosure.

FIG. 8 is a block structural diagram of an advertisement push apparatus according to an embodiment of the present disclosure. The advertisement push apparatus may be applied in the client device. The advertisement push apparatus includes a foreground advertisement playing module 810, a material displaying module 820 and a candidate advertisement selecting and playing module 830.

The foreground advertisement playing module 810 is configured to play a foreground advertisement according to a playing address of the foreground advertisement provided by a background server.

The material displaying module 820 is configured to display preview materials of all or some of n candidate advertisements upon detection of a selection instruction triggered by a user during a process of playing the foreground advertisement, where n is a positive integer.

The candidate advertisement selecting and playing module 830 is configured to select at least one candidate advertisement from the n candidate advertisements for playing, in response to a selection operation triggered by the user.

In view of the above, with the advertisement push apparatus according to this embodiment, multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

Figure 9:
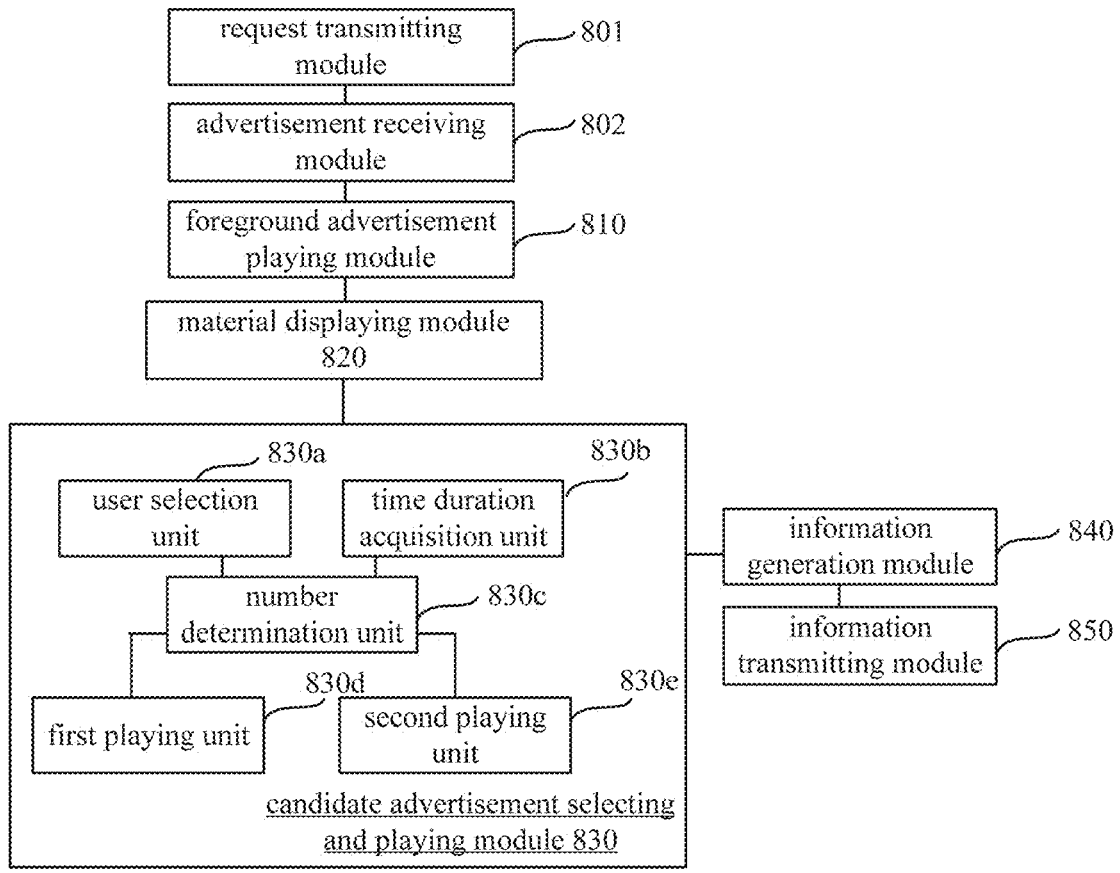
FIG. 9 is a block structural diagram of an advertisement push apparatus according to an embodiment of the present disclosure.

FIG. 9 is a block structural diagram of an advertisement push apparatus according to another embodiment of the present disclosure. The advertisement push apparatus may be applied in the client device. The advertisement push apparatus includes a foreground advertisement playing module 810, a material displaying module 820 and a candidate advertisement selecting and playing module 830.

The foreground advertisement playing module 810 is configured to play a foreground advertisement according to a playing address of the foreground advertisement provided by a background server.

The material displaying module 820 is configured to display preview materials of all or some of n candidate advertisements upon detection of a selection instruction triggered by a user during a process of playing the foreground advertisement, where n is a positive integer.

The candidate advertisement selecting and playing module 830 is configured to select at least one candidate advertisement from the n candidate advertisements for playing, in response to a selection operation triggered by the user.

The apparatus may further include a request transmitting module 801 and an advertisement receiving module 802.

The request transmitting module 801 is configured to transmit an advertisement acquisition request to the background server, with the advertisement acquisition request carrying user characteristic information. The user characteristic information is configured to reflect basic personal information of the user and/or personal habits and use preferences of the user on a network.

The advertisement receiving module 802 is configured to receive the playing address of the foreground advertisement and the preview materials of the n candidate advertisements transmitted by the background server. A user type of the user is determined by the background server based on the user characteristic information, and the foreground advertisement and the n candidate advertisements are selected by the background server from an advertisement pool according to the user type.

The apparatus may further include an information generation module 840 and an information transmitting module 850.

The information generation module 840 is configured to generate operational record information based on the selection operation. The operational record information is configured to reflect a selection sequence and a selection result of the candidate advertisement by the user.

The information transmitting module 850 is configured to transmit the operational record information to the background server. The background server is configured to re-determine the user type of the user based on the operational record information.

The selection instruction may be triggered by the user by means of a shaking operation, a touch operation, a voice signal or an image signal.

The material displaying module 820 may be configured to display a whole or a part of the general preview page, and the general preview page displays the preview materials of the n candidate advertisements at a same time. Alternatively, the material displaying module 820 may be configured to display one of multiple preview pages, and each of the multiple preview pages displays the preview materials of at least one of the n candidate advertisements.

The candidate advertisement selecting and playing module 830 may include a user selection unit 830a, a time duration acquisition unit 830b, a number determination unit 830c, a first playing unit 830d and a second playing unit 830e.

The user selection unit 830a is configured to provide the user with an interface for selecting the preview materials of candidate advertisements, to select candidate advertisements corresponding to the preview materials selected by the user.

The time duration acquisition unit 830b is configured to obtain a display time duration of the preview materials of the candidate advertisement.

The number determination unit 830c is configured to determine whether a number k of the candidate advertisements that have been selected by the user is less than a preset threshold q when the display time duration reaches a preset time duration, where k is an integer greater than or equal to 0 and q is an integer greater than 0.

The first playing unit 830d is configured to select q-k candidate advertisements automatically from the candidate advertisements that have not been selected by the user and play the k candidate advertisements selected by the user and the q-k automatically selected candidate advertisements, in a case that k<q.

The second playing unit 830e is configured to play the k candidate advertisements selected by the user in a case that k≥ q.

In view of the above, with the advertisement push apparatus according to this embodiment, multiple candidate advertisements are obtained by the client device from the background server, and are provided by the client device. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

In addition, the operational record information of the selection operation of the user performed on the candidate advertisement is transmitted by the client device to the background server. The user type of the user is re-determined by the background server according to the operational record information, and thus dynamic learning and adjustment of the user characteristic are realized, further improving the advertisement pushing accuracy.

Figure 10:
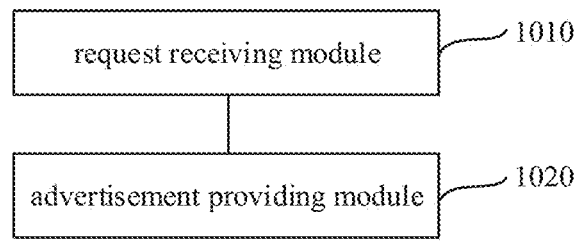
FIG. 10 is a block structural diagram of an advertisement push apparatus according to an embodiment of the present disclosure.

FIG. 10 is a block structural diagram of an advertisement push apparatus according to another embodiment of the present disclosure. The advertisement push apparatus may be used in the background server. The advertisement push apparatus includes a request receiving module 1010 and an advertisement providing module 1020.

The request receiving module 1010 is configured to receive an advertisement acquisition request transmitted by a client device.

The advertisement providing module 1020 is configured to provide the client device with a playing address of a foreground advertisement and preview materials of n candidate advertisements in response to the advertisement acquisition request, where n is a positive integer.

During the process of playing the foreground advertisement according to the playing address of the foreground advertisement, the client device is configured to display all or some of the candidate advertisements of the n candidate advertisements upon detection of a selection instruction triggered by the user. And at least one candidate advertisement is selected from the n candidate advertisements for displaying, in response to the selection operation triggered by the user.

In view of the above, with the advertisement push apparatus according to this embodiment, multiple candidate advertisements are provided by the background server to the client device, and are in turn provided by the client device to the user for selecting. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

Figure 11:
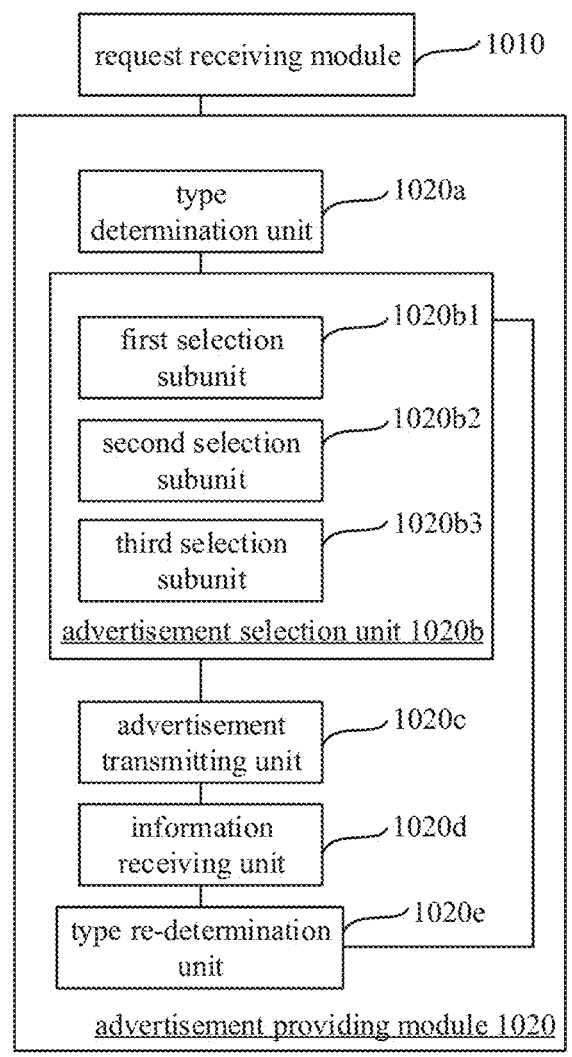
FIG. 11 is a block structural diagram of an advertisement push apparatus according to an embodiment of the present disclosure.

FIG. 11 is a block structural diagram of an advertisement push apparatus according to another embodiment of the present disclosure. The advertisement push apparatus may be applied in the background server. The advertisement push apparatus includes a request receiving module 1010 and an advertisement providing module 1020.

The request receiving module 1010 is configured to receive an advertisement acquisition request transmitted by a client device.

The advertisement providing module 1020 is configured to provide the client device with a playing address of a foreground advertisement and preview materials of n candidate advertisements in response to the advertisement acquisition request, where n is a positive integer.

During the process of playing the foreground advertisement according to the playing address of the foreground advertisement, the client device is configured to display all or some of the candidate advertisements of the n candidate advertisements upon detection of a selection instruction triggered by the user. And at least one candidate advertisement is selected from the n candidate advertisements for displaying, in response to the selection operation triggered by the user.

The advertisement acquisition request may carry user characteristic information, and the user characteristic information may be configured to reflect basic personal information of the user and/or personal habits and use preferences of the user on a network.

The advertisement providing module 1020 may include a type determination unit 1020a, an advertisement selection unit 1020b and an advertisement transmitting unit 1020c.

The type determination unit 1020a is configured to determine a user type of the user based on the user characteristic information.

The advertisement selection unit 1020b is configured to select the foreground advertisement and the n candidate advertisements from an advertisement pool according to the user type.

The advertisement transmitting unit 1020c is configured to transmit the playing address of the foreground advertisement and the preview materials of the n candidate advertisements to the client device.

The advertisement selection unit 1020b may include a first selection subunit 1020b1, a second selection subunit 1020b2 and a third selection subunit 1020b3.

The first selection subunit 1020b1 is configured to select the foreground advertisement from advertisements that match the user type.

The second selection subunit 1020b2 is configured to select a candidate advertisements from the advertisement that match the user type.

The third selection subunit 1020b3 is configured to select b candidate advertisements from advertisements that do not match the user type.

Where a+b=n, and a, b are positive integers.

The advertisement providing module 1020 may further include an information receiving unit 1020d and a type re-determination unit 1020e.

The information receiving unit 1020d is configured to receive operational record information transmitted by the client device. The operational recording information is generated by the client device based on a selection operation performed by the client device on the candidate advertisements. The operational record information is configured to reflect a selection sequence and a selection result of the candidate advertisement by the user.

The type re-determination unit 1020e is configured to re-determine the user type of the user based on the operational record information.

In view of the above, with the advertisement push apparatus according to this embodiment, multiple candidate advertisements are provided by the background server to the client device, and are in turn provided by the client device to the user for selecting. At least one candidate advertisement is selected from the multiple candidate advertisements for playing, in response to a selection operation of the user. The issue of wasting advertisement resources and bandwidth resources and failing to meet the viewing needs of the user in the conventional art is addressed. The user is provided with the ability to select advertisements, so that the user can select the advertisement of interest from the candidate advertisements for playing, according to his own needs, which can increase the advertisement click rate and the number of effective audiences, reduce the waste of the advertisement resources and bandwidth resources, meet the need of user's own choice and viewing, and improve interactivity, fun and user experience.

In addition, through the background server, multiple advertisements matching the user type are provided to the client device as some of the candidate advertisements, and multiple advertisements that do not match the user type are provided to the client device as the other ones of the candidate advertisements. In this case, different needs of multiple users will be met if a terminal is shared by the multiple users, so that each user may find advertisements meeting their own needs.

It should be noted that in the above description, the term "module" "unit" or "subunit" refers to computer logic for providing a specific function which may be implemented in hardware, firmware and/or software. The division of each of the function modules in the above embodiments is only for illustrative purpose. In actual implementation, the above-mentioned functions may be distributed to different function modules as required, or be realized by a different hardware device, each hardware device is to realize one or more of the functional modules. That is, the internal structure of the device is divided into different function modules, so as to complete all or parts of the function described above.

The number of the embodiment of the present disclosure is only for the purpose of illustration and is not to be considered as advantages and disadvantages of the embodiments.

It will be appreciated by those skilled in the art that all or a part of steps in the embodiments described above may be accomplished by hardware, or may be accomplished by related hardware which is instructed by programs. The programs may be stored in a computer-readable storage medium, which may include a read-only memory, a magnetic disk, an optical disk and so on.

The above descriptions are only preferred embodiments of the present disclosure and are not to limit the present disclosure. It should be noted that for those skilled in the art, any changes, equivalents and modifications which are made within the spirit and principle of the present disclosure shall fall within the protection scope of the present disclosure.

The invention claimed is:

1. An advertisement push apparatus comprising a processor and a memory for storing program instructions, wherein the processor is configured to execute the program instructions to:
   transmit an advertisement acquisition request to a background server, wherein the advertisement acquisition request carries user characteristic information reflecting at least one of basic personal information of a user or personal habits and use preferences of the user on a network;
   receive a playing address of a foreground advertisement and preview materials of n candidate advertisements transmitted by the background server without transmitting playing addresses of the n candidate advertisements, wherein the foreground advertisement and the n candidate advertisements are selected by the background server from an advertisement pool according to a user type of the user determined by the background server based on the user characteristic information;
   play the foreground advertisement according to the playing address of the foreground advertisement provided by the background server;
   display, on a playing interface of the foreground advertisement, prompt information indicating an operable action to trigger a preview material selection interface, the prompt information includes at least one of a graphical icon describing the operable action, and a text prompt stating that performing the operable operation would trigger the preview material selection interface, the operable action including a shaking operation;
   upon detection of the operable action performed on the apparatus, switch from displaying the foreground advertisement to displaying the preview material selection interface including the preview materials of all or some of the n candidate advertisements;
   update the preview material selection interface based on a selection operation, comprising:
      using different identifiers to distinguish selection status of the candidate advertisements, the selection status being selected status or unselected status; and
      superimposing and displaying instruction information indicative of a selection sequence on each selected preview material; and
   play at least one candidate advertisement from the n candidate advertisements, in response to the selection operation performed on the preview material selection interface.

2. The apparatus according to claim 1, wherein the processor is further configured to execute the program instructions to:
   generate operational record information based on the selection operation, wherein the operational record information is configured to reflect a selection sequence and a selection result of the candidate advertisement by the user; and
   transmit the operational record information to the background server, wherein the background server is configured to re-determine the user type of the user based on the operational record information.

3. The apparatus according to claim 1, wherein the processor is further configured to execute the program instructions to:
   display a whole or a part of a general preview page, or display one of a plurality of preview pages; wherein
   the general preview page displays preview materials of the n candidate advertisements at a same time, and each of the plurality of preview pages displays the preview materials of at least one of the n candidate advertisements.

4. The apparatus according to claim 1, wherein the processor is further configured to execute the program instructions to:
   obtain a display time duration of the preview materials of the candidate advertisement;
   determine whether a number k of the candidate advertisements that have been selected on the preview material selection interface is less than a preset threshold q when the display time duration reaches a preset time duration, wherein k is an integer greater than or equal to 0 and q is an integer greater than 0;
   select q-k candidate advertisements automatically from the candidate advertisements that have not been selected by the user and play the k candidate advertisements selected by the user and the q-k automatically selected candidate advertisements, in a case that k<q; and
   play the k candidate advertisements selected by the user in a case that k≥q.

5. The apparatus according to claim 1, wherein
   the foreground advertisement is selected from advertisements that match the user type;
   a pieces of candidate advertisements are selected from the advertisements that match the user type; and
   b pieces of candidate advertisements are selected from advertisements that do not match the user type,
   wherein a+b=n, and a and b each are positive integers.

6. The apparatus according to claim 1, wherein the operable action includes a specific touch gesture performed on a touch screen of the apparatus.

7. The apparatus according to claim 1, wherein the operable action includes inputting an image of a gesture of the user on the apparatus.

8. The apparatus according to claim 1, wherein the operable action includes inputting an image of a face image of the user on the apparatus.

9. An advertisement push method comprising:
   transmitting, by a computing device, an advertisement acquisition request to a background server, wherein the advertisement acquisition request carries user characteristic information reflecting at least one of basic personal information of a user or personal habits and use preferences of the user on a network;
   receiving a playing address of a foreground advertisement and preview materials of n candidate advertisements transmitted by the background server without transmitting playing addresses of the n candidate advertisements, wherein the foreground advertisement and the n candidate advertisements are selected by the background server from an advertisement pool according to a user type of the user determined by the background server based on the user characteristic information;
   playing the foreground advertisement according to a playing address of the foreground advertisement provided by a background server;
   displaying, on a playing interface of the foreground advertisement, prompt information indicating an operable action to trigger a preview material selection interface, the prompt information includes at least one of a graphical icon describing the operable action, and a text prompt stating that performing the operable operation would trigger the preview material selection interface, the operable action including a shaking operation;
   upon detection of the operable action performed on the computing device, switching from displaying the foreground advertisement to displaying the preview material selection interface including the preview materials of all or some of the n candidate advertisements;
   updating the preview material selection interface based on a selection operation, comprising:
   using different identifiers to distinguish selection status of the candidate advertisements, the selection status being selected status or unselected status; and
   superimposing and displaying instruction information indicative of a selection sequence on each selected preview material; and
   playing at least one candidate advertisement from the n candidate advertisements, in response to the selection operation performed on the preview material selection interface.

10. The method according to claim 9, wherein the method further comprises:
   generating operational record information based on the selection operation, wherein the operational record information is configured to reflect a selection sequence and a selection result of the candidate advertisement by the user; and
   transmitting the operational record information to the background server, wherein the background server re-determines the user type of the user based on the operational record information.

11. The method according to claim 9, wherein displaying the preview materials of all or some of the n candidate advertisements comprises:
   displaying a whole or a part of a general preview page, or display one of a plurality of preview pages, wherein the general preview page displays preview materials of the n candidate advertisements, and each of the plurality of preview pages displays the preview materials of at least one of the n candidate advertisements.

12. The method according to claim 9, wherein the playing at least one candidate advertisement from the n candidate advertisements comprises:
   obtaining a display time duration of the preview materials of the candidate advertisement;
   determining whether a number k of the candidate advertisements that have been selected on the preview material selection interface is less than a preset threshold q when the display time duration reaches a preset time duration, wherein k is an integer greater than or equal to 0 and q is an integer greater than 0;
   selecting q-k candidate advertisements automatically from the candidate advertisements that have not been selected by the user and playing the k candidate advertisements selected by the user and the q-k automatically selected candidate advertisements, in a case that k<q; and
   playing the k candidate advertisements selected by the user in a case that k≥q.

13. The method according to claim 9, wherein
   the foreground advertisement is selected from advertisements that match the user type;
   a pieces of candidate advertisements are selected from the advertisements that match the user type; and
   b pieces of candidate advertisements are selected from advertisements that do not match the user type,
   wherein a+b=n, and a and b each are positive integers.

14. The apparatus according to claim 1, wherein the instruction indicating the operable action displayed on the playing interface of the foreground advertisement includes an icon representing the operable action.

15. The apparatus according to claim 14, wherein the icon is in a form of a floating layer on the foreground advertisement.

* * * * *